US012668225B2

(12) United States Patent
Kirmaier et al.

(10) Patent No.: US 12,668,225 B2
(45) Date of Patent: Jun. 30, 2026

(54) TRAILER BRAKE CONTROL SYSTEM

(71) Applicant: AGCO International GmbH, Neuhausen (CH)

(72) Inventors: Philipp Kirmaier, Marktoberdorf (DE); Georg Frank, Marktoberdorf (DE)

(73) Assignee: AGCO International GmbH, Neuhausen am Rheinfall (CH)

( * ) Notice: Subject to any disclaimer, the term of this patent is extended or adjusted under 35 U.S.C. 154(b) by 497 days.

(21) Appl. No.: 18/253,812

(22) PCT Filed: Nov. 27, 2021

(86) PCT No.: PCT/IB2021/061028
§ 371 (c)(1),
(2) Date: May 22, 2023

(87) PCT Pub. No.: WO2022/130076
PCT Pub. Date: Jun. 23, 2022

(65) Prior Publication Data
US 2024/0001900 A1 Jan. 4, 2024

(30) Foreign Application Priority Data

Dec. 15, 2020 (GB) ..................................... 2019736

(51) Int. Cl.
*B60T 13/68* (2006.01)
*B60T 7/20* (2006.01)
(Continued)

(52) U.S. Cl.
CPC .............. *B60T 13/683* (2013.01); *B60T 7/20* (2013.01); *B60T 8/1701* (2013.01);
(Continued)

(58) Field of Classification Search
CPC .... B60T 13/683; B60T 13/268; B60T 13/581; B60T 7/20; B60T 8/1703; B60T 8/3605; B60T 11/108; B60T 17/22; B60T 2270/88
See application file for complete search history.

(56) References Cited

U.S. PATENT DOCUMENTS 5,080,445 A 1/1992 Brearley et al.
5,522,649 A 6/1996 Stender et al.
(Continued)

FOREIGN PATENT DOCUMENTS

DE 20315755 U1 12/2003
DE 102008048208 B4 7/2010
(Continued)

OTHER PUBLICATIONS

European Patent Office, International Search Report related to International Patent Application No. PCT/IB2021/061028, mail date Mar. 4, 2022, 6 pages.
(Continued)

*Primary Examiner* — Thomas J Williams

(57) ABSTRACT

A vehicle brake system includes a service brake system having a service brake circuit and a trailer brake control system. The trailer brake control system includes a trailer brake valve with a service brake demand input connected to the service brake circuit and a trailer service brake demand output port connected to a trailer brake control coupling. The output at the trailer brake demand output port is dependent on the pressure applied at the service brake demand input port. An electronic trailer brake control system has a control valve to fluidly connect a source of pressurized fluid with the trailer brake control coupling to trigger actuation of a service brake function on the trailer. The electronic trailer brake control system includes an ECU configured to actuate the control valve to apply service (Continued)

brakes on the trailer if it determines that the vehicle is at risk of jack-knifing.

14 Claims, 2 Drawing Sheets

(51) Int. Cl.

| | |
|---|---|
| *B60T 8/17* | (2006.01) |
| *B60T 8/36* | (2006.01) |
| *B60T 13/26* | (2006.01) |
| *B60T 13/58* | (2006.01) |
| *B60T 17/22* | (2006.01) |

(52) U.S. Cl.

CPC .......... *B60T 8/3605* (2013.01); *B60T 13/268* (2013.01); *B60T 13/581* (2013.01); *B60T 17/22* (2013.01); *B60T 2270/88* (2013.01)

(56) References Cited

U.S. PATENT DOCUMENTS

| | | | |
|---|---|---|---|
| 5,615,931 | A | 4/1997 | Stumpe et al. |
| 6,012,781 | A | 1/2000 | Gerum |
| 9,162,659 | B2 | 10/2015 | Morselli et al. |
| 9,327,694 | B2 | 5/2016 | Klostermann et al. |
| 9,802,587 | B2 | 10/2017 | Morselli |
| 10,549,742 | B2 | 2/2020 | Boulivan |
| 10,933,852 | B2 | 3/2021 | Goers et al. |
| 11,565,681 | B2 | 1/2023 | Dombek et al. |
| 2004/0015283 | A1 | 1/2004 | Eckert et al. |
| 2011/0193407 | A1 | 8/2011 | Wohltmann et al. |
| 2012/0025487 | A1 | 2/2012 | Kneer et al. |
| 2012/0283925 | A1* | 11/2012 | Barlsen ................... B60T 17/22 |
| | | | 701/70 |
| 2014/0200786 | A1 | 7/2014 | Morselli et al. |
| 2015/0239441 | A1* | 8/2015 | Klostermann ........ B60T 11/108 |
| | | | 303/7 |
| 2015/0344011 | A1 | 12/2015 | Casali et al. |
| 2016/0332606 | A1 | 11/2016 | Buchner et al. |
| 2018/0029569 | A1 | 2/2018 | Schick et al. |
| 2018/0029572 | A1 | 2/2018 | Schick et al. |
| 2018/0154874 | A1 | 6/2018 | Kulkarni et al. |
| 2018/0215358 | A1 | 8/2018 | Hall et al. |
| 2018/0339685 | A1 | 11/2018 | Hill et al. |
| 2019/0039578 | A1 | 2/2019 | Sanchez et al. |
| 2019/0118788 | A1 | 4/2019 | Bruett et al. |
| 2019/0225196 | A1 | 7/2019 | Niedert et al. |
| 2019/0263371 | A1 | 8/2019 | Goers et al. |
| 2019/0270436 | A1 | 9/2019 | Brütt et al. |
| 2019/0315330 | A1 | 10/2019 | Kasper et al. |
| 2019/0366989 | A1 | 12/2019 | James et al. |
| 2020/0001841 | A1 | 1/2020 | Green et al. |
| 2020/0040956 | A1 | 2/2020 | Cremona et al. |
| 2020/0079341 | A1 | 3/2020 | van Thiel |
| 2020/0139953 | A1 | 5/2020 | Dombek et al. |
| 2020/0223414 | A1* | 7/2020 | Brütt ..................... B60T 13/263 |
| 2021/0129808 | A1 | 5/2021 | Graham et al. |
| 2021/0188279 | A1 | 6/2021 | Glavinic et al. |
| 2021/0284109 | A1 | 9/2021 | Brütt et al. |

FOREIGN PATENT DOCUMENTS

| | | |
|---|---|---|
| DE | 102009045191 B4 | 2/2013 |
| DE | 102011053707 A1 | 3/2013 |
| DE | 102013000275 A1 | 7/2014 |
| DE | 102012101501 B4 | 5/2016 |
| DE | 202016102061 U1 | 7/2017 |
| DE | 102015112490 B4 | 7/2018 |
| DE | 102018002488 B4 | 7/2021 |
| EP | 0378810 A1 | 7/1990 |
| EP | 2165901 A1 | 3/2010 |
| EP | 2305524 A1 | 4/2011 |
| EP | 2269880 B1 | 7/2015 |
| EP | 3009312 A1 | 4/2016 |
| EP | 2570318 B1 | 5/2018 |
| EP | 2783928 B1 | 5/2018 |
| EP | 3401177 A1 | 11/2018 |
| EP | 2123528 B1 | 4/2019 |
| EP | 3450270 B1 | 3/2021 |
| EP | 3744590 B1 | 3/2023 |
| EP | 3569458 B1 | 9/2023 |
| GB | 2500221 A | 9/2013 |
| IT | 201800007776 A1 | 2/2020 |
| JP | 2019206312 A | 12/2019 |
| SE | 539265 C2 | 6/2017 |
| WO | 2003029061 A1 | 4/2003 |
| WO | 2011054424 A1 | 5/2011 |
| WO | 2019030105 A1 | 2/2019 |
| WO | 2020200347 A1 | 10/2020 |

OTHER PUBLICATIONS

UK Intellectual Property Office, Search report for related UK Application No. GB2019736.4, dated May 21, 2021, 6 pages.
Opposition against EP4263393, ZF Friedrichshafen AG, Oct. 1, 2025, 40 pages.
Opposition against EP4263393, Haldex BA, Oct. 1, 2025, 58 pages (including translation).

\* cited by examiner

TRAILER BRAKE CONTROL SYSTEM

CROSS REFERENCE TO RELATED APPLICATIONS

This application is a national phase entry under 35 U.S.C. § 371 of International Patent Application PCT/IB2021/061028, filed Nov. 27, 2021, designating the United States of America and published in English as International Patent Publication WO2022/130076 A1 on Jun. 23, 2022, which claims the benefit of the filing date of U.K. Patent Application 2019736.4, filed Dec. 15, 2020, the entire disclosure of which is incorporated herein by reference.

TECHNICAL FIELD

The present invention relates to a trailer brake control system for a vehicle. The invention relates in particular to a trailer brake control system for an agricultural vehicle such as a tractor.

BACKGROUND

Many vehicles are provided with attached trailers for the transportation of goods and materials. For large-scale use such trailers may be provided with braking systems to allow for safe control of the trailer, and to prevent jack-knifing or skidding of the trailer when braking. Typically, the brake system on the trailer is coupled to an output from a trailer brake control system forming part of the towing vehicle brake system and which provides a fluid pressure signal for actuating the brakes on the trailer.

Vehicles used mainly on roads, such as heavy goods vehicles including trucks, often employ electronic brake control systems. In such systems, the fluid pressure forwarded to the brakes of both the towing vehicle and the trailer is not determined solely in response to pressure applied to a brake pedal. Rather, the pressure forwarded to the brakes is adjusted by an electronic control unit (ECU). This is advantageous as the ECU can be programmed to regulate the applied brake force taking into account inputs provided by various sensors which are indicative of the operative conditions of the vehicle and trailer and other factors. Electronic trailer brake control systems are especially advantageous in avoiding jack-knifing. With a conventional fluid only activated trailer brake control system, when a vehicle towing a trailer is subject to engine braking in which it is decelerated by internal resistance in the vehicle (from the engine, transmission or other components) rather than the application of a service or parking brake, the trailer brakes are not activated and the trailer may tend to skid. To avoid this, an electronic trailer brake control system can be configured to activate the brakes on the trailer when a potential jack-knifing situation is detected.

In addition, trucks are usually equipped with dual service brake systems wherein two separate circuits are activated independently when the brake pedal is depressed. A first circuit may thereby act on, e.g., the right front wheel and the left rear wheel (or the left wheels of tandem rear axle) while a second circuit acts the left front wheel and the right rear wheel (or the right wheels of tandem rear axle). If one of the circuits fail, the other circuit can still provide sufficient brake force to safely decelerate the vehicle.

With trucks often travelling at high speeds on roads, dual service brake systems and electronic trailer brake control systems have become a worldwide standard for these types of vehicles. Whilst such system uses components that are expensive, the relatively high production figures for vehicles of this type enable the costs to be kept at an acceptable level.

Electronic trailer brake control systems are less commonly used on agricultural vehicles, such as tractors, for a number of reasons.

Regulatory requirements are less stringent worldwide. For example, Regulation (EU) 2015/68 "Approval of Braking Requirements for Agricultural and Forestry Vehicles" (the so called "EU Mother Regulation"), which introduces increased safety requirements for the operation of trailer brake systems in the agricultural sector, is only mandatory in the EU, but is not applicable to other important markets like the United States of America or Russia.

The need for a trailer braking system depends on the maximum speed of the vehicle and vehicles which do not exceed a maximum vehicle speed (e.g., 40 kph to 50 kph) may not necessarily be provided with a trailer brake control system.

Tractors are operated with a variety of different implements. An implement may be fully-mounted or semi-mounted, whereby a semi-mounted implement has a wheel engaging with the ground while a fully-mounted implement puts all its load on the three-point linkage. With these type of implements, jack-knifing does not occur as implement and tractor are rigidly connected. Other implements may be so-called trailed implements similar to truck trailers which are connected to the tractor by a ball-type hitch system which allows relative movement between trailer and tractor so that jack-knifing is an issue.

In addition, tractors are additionally provided with a steering brake function, which enables the wheels of on each side to be braked independently to enable tighter turns in the field. This requires special provisions in the service brake not common for trucks.

In view of the issues discussed above, customers for agricultural vehicles such as tractors are demanding greater choice in specifying the type of brake system they require in order to perfectly meet their needs at reasonable costs, subject to legal constraints.

There is need, therefore, for a vehicle brake system which can be more easily adapted to provide different functionality at reasonable costs.

In particular, it is an objective of the disclosure to provide a vehicle brake system incorporating a trailer brake control system that can be easily adapted to provide electronic trailer braking at reasonable costs.

BRIEF SUMMARY

A vehicle brake system comprises a source of pressurized fluid; a service brake system having at least one service brake fluid circuit for forwarding a service brake demand of an operator; a trailer brake control system for connection to a trailer drawn by the vehicle. The trailer brake control system has a trailer brake control coupling and a trailer brake valve which comprises: a brake demand input port; and a trailer brake demand output port for connection to the trailer brake control coupling. A fluid pressure output at the trailer brake demand output port is dependent on the fluid pressure applied at the brake demand input port. The brake system comprises an electronic trailer brake control system including a control valve operative to selectively connect the trailer brake control coupling with a source of pressurized fluid. The electronic trailer brake control system is operative in use to selectively supply pressurized fluid indicative of a service brake demand for the trailer to the trailer brake control coupling.

In some embodiments, the electronic trailer brake control system is able to control actuation of the service brake function on a trailer towed by the vehicle. Actuation of the electronic trailer brake control system generates a fluid pressure at the trailer control coupling which is forwarded as a service brake demand to the brake system on the trailer. Advantageously, the electronic trailer brake control system can be used to reduce the risk of jack-knifing, for example.

The term "trailer" as used herein should be understood as encompassing any suitable unpowered vehicle or implement with a suitable braking system which can be controlled through the brake system of the towing vehicle when suitably coupled.

In an embodiment, the electronic trailer brake control system comprises an electronic control system including an electronic control unit (ECU) or controller, the ECU being configured in use to actuate the control valve in order to supply pressurized fluid indicative of a service brake demand for the trailer to the trailer brake control coupling in dependence on one or more operational conditions of the vehicle and/or a trailer towed by the vehicle being met. The ECU may be configured in use to actuate the control valve in order to supply pressurized fluid indicative of a service brake demand for the trailer to the trailer brake control coupling in dependence on one or more operational conditions of the vehicle and/or a trailer towed by the vehicle indicative of a PUSH condition being met.

The control valve may comprise a solenoid valve actuatable under control of the electronic control system and operative to cause a pressurized fluid indicative of a service brake demand for the trailer to be forwarded to the trailer brake control coupling.

The control valve may have an inlet fluidly connected with the source of pressurized fluid and a fluid outlet, the control valve being movable between an in-operative position in which the inlet and outlet are disconnected so that fluid is unable to flow from the inlet through the outlet and at least one operative position in which the inlet and outlet are fluidly connected and fluid is able to flow from the inlet through the outlet. The outlet of the control valve may be fluidly connected with the trailer brake control coupling through a shuttle valve. Alternatively, the control valve is a pilot valve, the outlet of the control valve being connected to a control port of a piloted valve, the piloted valve being operative to selectively connect the trailer brake control coupling to a source of pressurized fluid when activated by the control valve. In this embodiment, the piloted valve may be connected in a fluid line between the source of pressurized fluid and the trailer brake control coupling. The piloted valve is biased to an inoperative position in which the trailer brake control coupling is not connected with the source of pressurized fluid and moveable to at least one operative position in which the trailer brake control coupling is connected with the source of pressurized fluid. The trailer brake demand outlet port and the piloted valve may be connected with the trailer brake control coupling through a shuttle valve. The piloted valve may be a proportional valve such that the pressure of the fluid directed to the trailer brake control coupling is dependent on the fluid pressure applied at a control port of the piloted valve from the control valve.

The electronic trailer brake control system may be configured such that the pressure of the fluid supplied to the trailer brake control coupling is insufficient to cause the service brakes on the trailer to be fully applied.

In an embodiment, a pressure-limiting valve is provided in the line between the source of pressurized fluid and the control valve to limit the fluid pressure level through the control valve.

In an embodiment, the system comprises a pressure sensor for monitoring the pressure of the fluid provided to the trailer brake control coupling, the ECU being configured to control operation of the electronic trailer brake control system in dependence on an output from the pressure sensor in order to maintain the pressure of the fluid supplied to the brake demand input port at a predetermined level.

The control valve may be a proportional valve.

A pressure discharge valve may be connected in a control system pilot fluid line between the control valve and the piloted valve to connect the line to ambient when the discharge valve is in a first position. The electronic trailer brake control system may be configured such that the discharge valve is placed in the first position when the control valve is in an inoperative position. The discharge valve may be a solenoid valve biased to the first position but which can be activated to move the valve to a second position in which the control system pilot fluid line is not connected with ambient.

The service brake system may be hydraulic and the source of pressurized fluid may be a source of pressurized air. The service brake system may have a service brake circuit connected with the brake demand input port of the trailer brake valve, the trailer brake valve being configured to connect the trailer brake demand output port to the source of pressurized air such that the pressure of air emitted through the trailer brake demand output port is dependent on the pressure of hydraulic fluid at the brake demand input port.

The service brake system may be pneumatic and the source of pressurized fluid may be a source of pressurized air. The service brake system may have a service brake line connected with the brake demand input port of the trailer brake valve, the trailer brake valve being configured to connect the trailer brake demand output port to the source of pressurized air such that the pressure of air emitted through the trailer brake demand output port is dependent on the pneumatic pressure fluid at the brake demand input port.

The trailer valve may further have a park brake demand input port fluidly connected with a pneumatic park brake circuit, the fluid pressure output at the trailer brake demand output port being dependent on the fluid pressure applied at the brake demand input port and/or the fluid pressure applied park brake demand input port. The fluid pressure output at the trailer brake demand output port may be inversely proportional to the fluid pressure applied at the park brake demand input port.

In certain embodiments, there is provided an agricultural vehicle comprising a vehicle brake system. The agricultural vehicle may be a tractor.

BRIEF DESCRIPTION OF THE DRAWINGS

The disclosure will now be described, by way of example only, with reference to the accompanying drawings in which.

DETAILED DESCRIPTION

The term "circuit" as used herein is not limited to a closed loop arrangement of lines and may refer to arrangements as simple as a single line linking two components or consumers.

Whilst an embodiment of the invention is described below with reference to a combined hydraulic and pneumatic brake system, the principles disclosed herein can be adapted for use with purely hydraulic or purely pneumatic vehicle brake systems.

Figure 1:
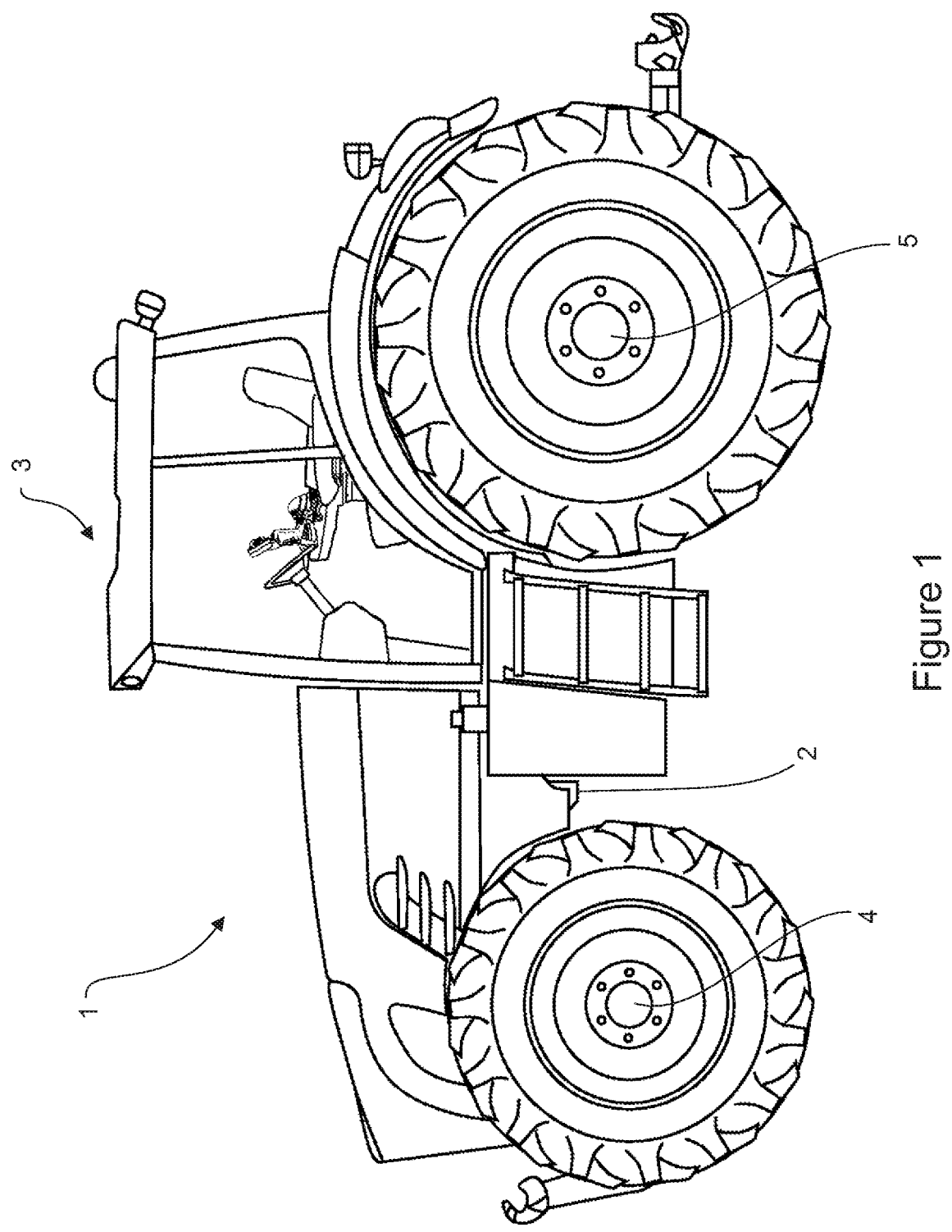
FIG. 1 is a side view of an agricultural tractor having a brake system.

FIG. 1 shows a representation of an agricultural vehicle 1, in the form of a tractor. The tractor 1 comprises a chassis 2, a cab 3, a front axle 4, and a rear axle 5 and is adapted to tow a range of different trailers. The tractor 1 has a brake system 10 which is connectable to a brake system on a trailer to control the trailer brakes.

Figure 2:
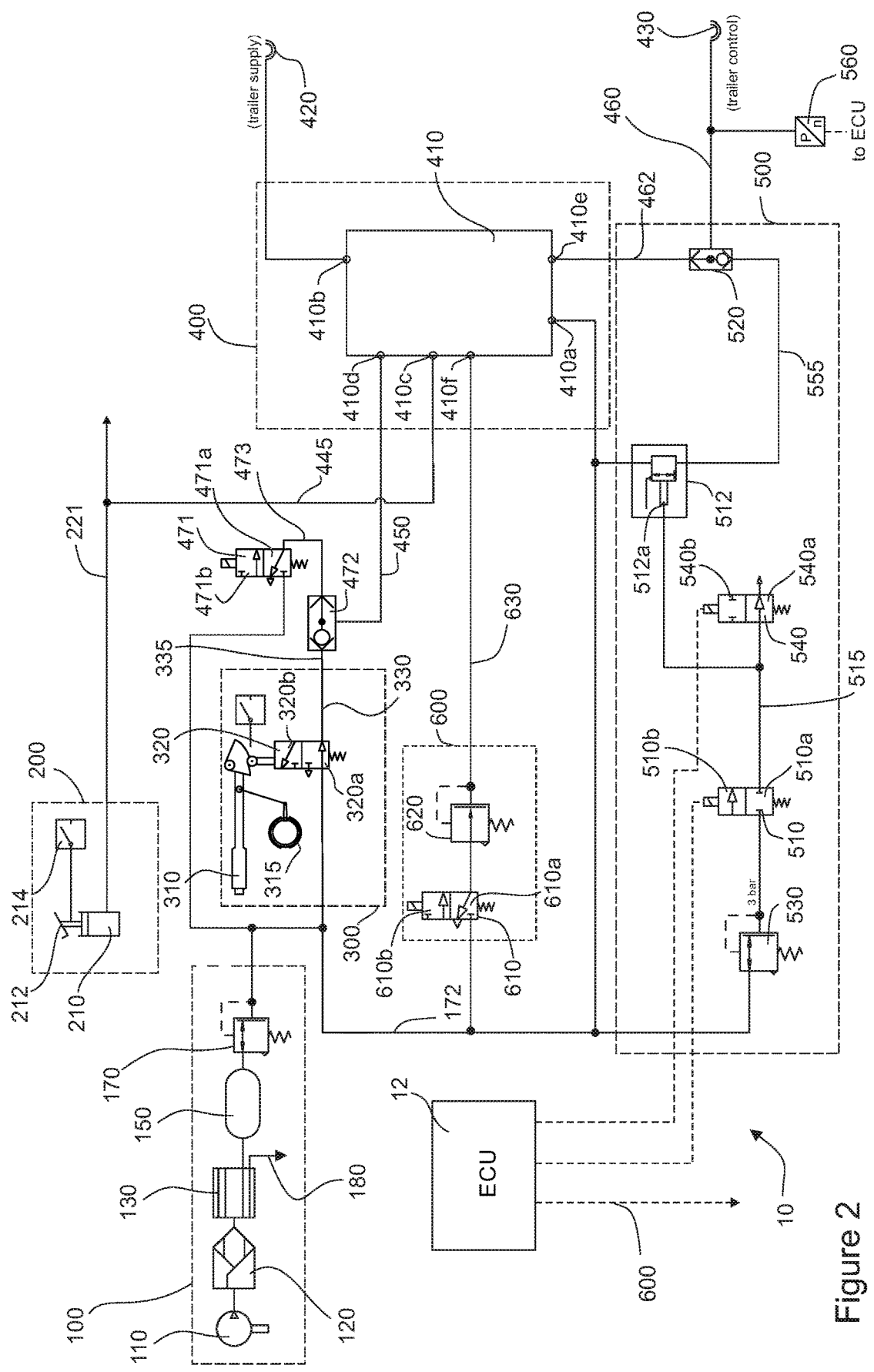
FIG. 2 is a schematic representation a part of a vehicle brake system suitable for use in the tractor of FIG. 1.

FIG. 2 illustrates a brake system 10 installed on the tractor 1 and which comprises electronic control unit ECU 12. In the brake system 10, the vehicle service brakes are actuated hydraulically and the brakes on the trailer are pneumatic. In this embodiment, the park brakes on the vehicle are mechanically actuated.

The brake system 10 includes an air supply system, indicated generally with dotted lines 100, which supplies compressed air to various consumers on the vehicle and its trailer or other towed implement when connected. The principal consumers of interest shown in FIG. 1 are a park brake system 300, a trailer brake control system 400, and an electronically controlled pilot trailer brake control system 500.

The air supply system 100 comprises an air compressor 110, an air drier unit 120 and a prioritization valve arrangement 130. The air compressor 110 driven by the combustion engine of the vehicle (or any prime mover such as an electric motor) supplies air into the air drier unit 120, which includes a reservoir to store compressed air and a granule cartridge to extract water from the air. From the air drier unit 120, compressed air is passed through the prioritization valve arrangement 130 which is configured to prioritize supply to primary consumers of the vehicle over the supply to secondary consumers. Primary consumers include safety-critical systems such as the park brake system 300, the trailer brake control system 400, and the electronic trailer brake system 500. Secondary consumers, indicated generally at 180, are not shown for clarity reasons but might include a tire pressure control system (TPCS) or a cleaning system for an engine air filter, for example. The prioritization valve arrangement 130 is operative maintain the integrity of the primary consumers in the event that the air supply is not capable of meeting all demands.

The various primary consumers shown in FIG. 2 are supplied via a reservoir 150 and a pressure relief valve 170 to limit the pressure level to protect the components of the system. For use with components common in pneumatic brake systems, the pressure relief valve may be set to limit the pressure to around 8.5 bar, for example. The reservoir 150 and first pressure relief valve 170 are assigned to a joint supply line 172. The joint supply line 172 supplies compressed air to the park brake system 300, the trailer brake control system 400, and the electronic trailer brake control system 500. The pressure in the reservoir 150 may be monitored by a pressure sensor (not shown). If the pressure drops below a minimum value, such as bar, the compressor 110 is switched on (or adjusted to higher delivery) to refill the reservoir 150. Thereby the park brake system, the trailer brake control system and the electronic pilot trailer brake control system 500 are kept responsive.

The tractor air supply system 100 as shown in FIG. 2 is an illustrative example only and could be replaced by any other suitable air supply system. For example, an air supply system could be adopted, such as that described in International Patent Application Publication WO 2011/001261, "Vehicle Tyre Inflation Systems," which comprises an additional higher flow rate compressor.

The service brake system 200 includes a service brake circuit 221 with a brake master cylinder 210 operated by a brake pedal 212 depressed by the foot of an operator to generate a fluid pressure in the service brake circuit 221. The fluid pressure generated in the service brake circuit 221 is dependent on the pressure applied by the operator to brake pedal and is indicative of a brake demand by the operator. This fluid pressure will, therefore, be referred to as a Service Brake Demand Signal (SBDS). As is common practice in agricultural machines such as tractors, in order to increase brake actuation force, the service brake circuit 221 may include brake boosters supplied with hydraulic fluid under pressure by a hydraulic pump (not shown) so that the hydraulic pressure applied at the brake actuators is higher than that produced by the operator pressing on the brake pedal.

Though FIG. 2 shows a single service brake circuit 221, there may be more than one service brake circuit in a brake system 10. For example, the service brake system 200 could have two separate service brake circuits 221 each operatively connected with a separate brake master cylinder which are actuated from a single brake pedal 212. This provides for redundancy in case one of the circuits fails. In a dual circuit service brake system, a first service brake circuit may be hydraulically connected to the brake actuators on the rear axle 5 while a second service brake circuit is hydraulically connected to the brake actuators of the front axle 4. In case of failure of one of service brake circuits (e.g., a hydraulic line breaks), the other circuit can still be pressurized to provide braking capability. However, the assignment of the service brake circuits to respective vehicle wheels or axles may vary. For example, an alternative configuration may have a diagonal assignment so that brakes on the front left wheel and rear right wheel may be actuated by a first service brake circuit while those on the front right wheel and rear left wheel may be actuated by a second service brake circuit. In a further alternative, the circuits may be arranged to actuate the brakes on opposite sides of the tractor, which may be required to provide a brake steering functionality. If dual search brake circuits are provided, the fluid pressures in the first and second service brake circuits represent service brake demand signals SBDS1, SBDS2 generated by the driver.

The park brakes on the vehicle are actuated mechanically. The park brake system 300 includes a park brake actuator in the form of a park brake lever 310, which is mechanically linked to the park brakes on the vehicle (indicated at 315), for example by means of a cable. FIG. 2 shows the park brake lever in a park brake off position in which the lever is lowered. To actuate the park brakes, the driver moves the park brake lever 310 upwardly to a park brake on position. This movement is mechanically transmitted to the park brake actuators on the vehicle to apply the park brakes in a well-known manner.

The park brake system 300 as illustrated is actuated mechanically by the park brake lever. However, alternative park brake systems could be employed. For example, a pneumatic park brake system which allows for electronic control of the park brake such as that described in the European Patent EP 2982555 B1, "Parking Brake," could be used.

The brakes on the trailer are pneumatic. In order that the driver can control the brakes on the trailer using the park brake lever 310, the lever is operatively connected with a park brake valve 320. The park brake valve 320 is connected to joint supply line 172 and is configured to selectively connect or disconnect the joint supply line 172 with a park brake circuit 330. The park brake circuit 330 provides a park brake demand signal PBDS for actuating the brakes on the trailer as will be described in detail below.

References herein to a "brake demand" or "brake demand signal" in relation to a pneumatic or hydraulic line or circuit should be understood as referring to a pressure of the fluid in the line or circuit which is indicative of a required braking force.

The trailer brake control system 400 is provided with a trailer brake valve 410 to control application of the brakes on a trailer in dependence on brake demand signal SBDS or PBDS received from the service brake system 200 and/or the park brake circuit 330. Trailer brake valve 410 also forwards compressed air to the air supply of the trailer. When the vehicle is towing a trailer, the pneumatic system of the trailer (not shown) is connected via standardized trailer couplings 420, 430. These include a trailer supply coupling 420 and a trailer brake control coupling 430. The trailer supply coupling 420 is usually color-coded red and provides general air supply to the trailer including its brake system and any other consumers. The trailer brake control coupling 430 is usually color-coded yellow and is provided to forward a trailer service brake demand signal TSBDS to the trailer brake system.

In a common arrangement, the brake system on the trailer may have combined brake units which have a first, service brake actuator responsive to applied air pressure to apply a braking force to provide a service brake function and a second, park brake actuator which is spring-biased to apply a braking force to provide a park brake function. The park brake actuator is held in a brake released position by air pressure from the internal air supply reservoir on the trailer when the park brakes are deactivated. If the internal air supply reservoir on the trailer is discharged, the spring load applies the full brake force. The trailer supply coupling 420 is normally connected to the internal air supply reservoir on the trailer via a brake valve on the trailer. The pressure applied to the brake valve on the trailer through the trailer supply coupling 420 provides the park brake functionality on the trailer. If the pressure forwarded to the trailer brake valve through the supply coupling 420 drops below a certain value, the spring-biased park brake actuators apply the brakes on the trailer. This would typically happen if the trailer is decoupled from the tractor or if a failure on the pneumatic connection occurs. The trailer brake control coupling 430 is also connected to the brake valve on the trailer. The trailer service brake demand fluid pressure signal TSBDS provided through the brake control coupling 430 pilot-controls the brake valve of the trailer to generate a controlled brake pressure forwarded to the service brake actuators of the combined brake units, which apply a corresponding service brake force to the wheels of the trailer.

Operation of the trailer brake valve 410 is now be explained in detail.

The trailer brake valve has six ports 401a to 401f.

The trailer brake valve 410 is connected to the air supply system 100 via joint supply line 172 of the supply system 100 at a first port 410a, which will be referred to as a fluid supply inlet port. The air supply is then forwarded via a second port 410b to the trailer supply coupling 420 and thereby the trailer (not shown). The second port 410b will be referred to as a fluid supply outlet port.

The third port 410c is operatively connected to first service brake circuit 221 via first service brake input line 445. This port receives the service brake demand signal (hydraulic fluid pressure) SBDS from the service brake circuit 221 and will be referred to as a service brake demand input port.

The fourth port 410d is operatively connected to the park brake circuit 330 via park brake demand input line 450 and a first shuttle valve 472 to receive a park brake demand signal (air pressure) PBDS from the park brake circuit 330. The fourth port 410d will be referred to as a park brake demand input port.

As mentioned above, the park brake valve 320 is operatively connected with the park brake lever 310 and is configured to selectively connect or disconnect the joint supply line 172 with the park brake circuit 330 in response to actuation of the park brake lever 310. The park brake valve 320 is movable between a first position 320a as shown in FIG. 2 in which the park brake circuit 330 is connected with the joint supply line 172 and so is pressurized. If the park brake lever 310 is moved to a park brake on position, this moves the park brake valve to a second position 320b in which the park brake circuit 330 is vented to ambient and so is depressurized. The pressure in the park brake circuit is forwarded to the park brake demand input port 410d as a park brake demand signal PBDS through the first shuttle valve 472 and the park brake demand input line 450. The park brake valve 320 is biased to the first position 320a so that the park brake circuit 330 and the park brake demand input line 450 are pressurized in the event that the connection between the park brake lever and the valve fails. This ensures that the service brakes on the trailer are not unintentionally applied in these circumstances.

The service brake demand signal SBDS and the park brake demand signal PBDS control an internal relay of valve 410 (not shown in detail) which generates a trailer service brake demand signal (air pressure) TSBDS which is forwarded to the trailer brake control coupling 430 through the fifth port 410e to control the service brake functionality of the trailer. The fifth port 410e will be referred to as the trailer service brake demand output port.

The park brake demand signal PBDS provided at port 410d is inverted by the internal relay valve for onward transmission as a TSBDS through port 410e to enable the service brake actuators on the trailer to be used to apply a braking force in response to actuation of the park brakes on the towing vehicle. In normal use, when a driver applies the park brakes on the vehicle using the park brake lever 310, the park brake valve 320 is moved to its second position 320b and the pressure PBDS applied at the park brake demand input port 410d is reduced to zero. Since the trailer brake valve 410 provides a TSBDS output at port 410e that is inversely proportional to the air pressure at port 410d, this will result in a high pressure TSBDS at the port 410e, which is forwarded to the brake valve on the trailer so that the service brake actuators on the trailer are actuated to apply a high braking force. Accordingly, the service brake actuators are activated to provide a braking force when the park brakes are applied on the towing vehicle, provided the trailer remains pneumatically coupled to the towing vehicle.

The ability to generate a TSBDS through port 410e by use of the park brake system 300 on the vehicle is beneficial in providing an emergency braking arrangement in the event the service brakes on the vehicle should fail. In these circumstances, the driver can attempt to slow the vehicle by applying the park brakes on the towing vehicle using the lever 310. This moves the park brake valve 320 to a position in between first position 320a and second position 320b to manually reduce the air pressure in the park brake circuit 330. The trailer brake valve 410 provides a TSBDS output at port 410e that is inversely proportional to the reducing air pressure in the park brake circuit 330 so that the service brake actuators on the trailer are actuated in a controlled manner to provide a braking force.

A sixth port 410f is used to provide a pre-pressurization function. The hydraulic service brake circuit 221 works with relatively low volumes of fluid in comparison with the pneumatic brake systems. To compensate for this, a pre-pressurization system 600 is operative to provide a basic level of air pressurization to the trailer service brake demand output port 410e when the brake pedal is depressed, prior to the hydraulic pressure in the service brake circuit 221 building up. The pre-pressurization port 410f is connected with the joint supply line 172 though a pre-pressurization valve 610 and a pre-pressurization pressure relief valve 620. The valve 610 is a solenoid valve which is biased to a first position 610a, as shown in FIG. 2, in which a pre-pressurization line 630 to the pre-pressurization port is not connected with the joint supply line. When activated, the pre-pressurization valve 610 is moved to a second position in which the pre-pressurization line 630 is connected with the joint supply line. This pressurizes the pre-pressurization line 630 and the fluid pressure applied at port 410f controls an internal relay of valve 410 (not shown in detail) which generates pre-pressurization trailer service brake demand signal (air pressure) at the trailer service brake demand outlet port 410e. Actuation of the pre-pressurization valve 610 is controlled by the ECU in response to a signal from a brake pedal switch 214. When the brake pedal 212 is depressed, the switch 214 sends a signal to the ECU to indicate that a service brake demand is being generated. In response, the ECU 12 actuates the pre-pressurization valve 610 to pre-pressurize the service brakes on the trailer. When the brake pedal 210 is released and the switch 214 is no longer indicating that a service brake is being demanded, the pre-pressurization valve 620 is deactivated and moves back to its first position. The pre-pressurization pressure relief valve 620 is included to limit the pressure applied at the pre-pressurization port when the valve 610 is open.

The trailer brake valve 410 may have provision for responding to critical driving situations in case of breakaway at trailer couplings 420, 430. Furthermore, the trailer brake valve 410 may have provision to adjust the advancement of the trailer brake so that when the service brake on the vehicle is activated only slightly, a slightly higher pressure is applied to the trailer to ensure that the trailer brakes are operated prior to the service brake of the tractor. This reduces the risk of the trailer pushing the tractor which could lead to jack-knifing. In known arrangements, the degree of advancement can be set manually at the trailer brake valve 410.

Trailer brake valves 410 of the type described and which produce a fluid pressure output at the trailer brake demand output port which is dependent on the fluid pressure applied at a brake demand input port are well known in the art and details of the valve will not be described further.

In order to comply with the vehicle braking requirements (RVBR) of the "EU Mother Regulation", the trailer brake control system 400 is provided with an additional control circuit 470 operative to inhibit operation of the trailer brakes when activated. This is provided so that the driver is able to test whether the towing vehicle is capable of holding the trailer using only the brakes on the towing vehicle. During the test, the vehicle is not allowed to move.

The additional control circuit 470, referred to as "EU test control circuit", comprises a test valve 471 connected to the air supply system via the joint supply line 172 and to a first input of the first shuttle valve 472 by a test control line 473.

A second input to the first shuttle valve 472 is connected to the park brake circuit 330. The output side of the first shuttle valve 472 is connected to port 410d of the trailer brake valve 410 via the park brake demand (PBDS) input line 450. The first shuttle valve 472 provides a pneumatic OR functionality (i.e., logic control) to forward either of the pressure in the park brake circuit 330 or the pressure in control line 473, whichever is at greater pressure. The test valve 417 is solenoid controlled and connected to the ECU. The valve is biased by a spring to a first position 471a (as shown in FIG. 2) in which the test control line 473 is discharged to ambient. In this configuration, the first shuttle valve 472 blocks test control line 473 (as shown in FIG. 1) so that only the pressure (PBDS) coming from park brake circuit 330 is forwarded to park brake demand input line 450 and thereby the park brake demand input port 410d of trailer brake valve 410. When the test is to be carried out, the test valve 471 is energized to move to the second position 471b in which the control line 473 is connected to joint supply line 172. This pressurizes the test control line 472, causing the first shuttle valve to be switched so that the park brake demand input line 450 and the park brake demand input port 410d are also pressurized while the connection to the park brake circuit 330 is blocked. In this configuration, the pressure applied at the park brake demand input port 410d remains high even if the park brakes are applied on the vehicle and the pressure in the park brake circuit 330 reduced to zero. This inhibits actuation of the service brake function of the trailer brakes when the park brakes on the vehicle are applied so that the test can be performed as required.

The vehicle brake system 10 as so far described comprising the service brake system 200, the park brake system 300, the trailer brake control system 400, and the EU control circuit 470 is known in the art and actuation of the trailer brakes is dependent on the operator initiating a brake demand using either the service brake system 200 or the park brake system 300. A brake system comprising these components, optionally excluding the EU control circuit where not required, can be adopted if electronic trailer brake control functionality is not required. As discussed above, such a brake system may be sufficient for some type of implements or vehicles which do not exceed a certain maximum speed and can be offered at relatively low cost. However, the brake system 10 can be modified to provide electronic trailer brake functionality if required as discussed below.

For example, the vehicle brake system 10 is additionally provided with an electronic trailer brake control system 500. The electronic trailer brake control system 500 comprises a fluid circuit having a control valve 510, a piloted relay valve 512 and a second shuttle valve 520, and an electronic control system including an ECU 12. The electronic trailer brake control system 500 is operative under control of the ECU to selectively open or close a fluid connection between the joint supply line 172 and the trailer brake control coupling 430.

The trailer control coupling 430 is connected to an outlet of the second shuttle valve 520 by a trailer service brake demand fluid line 460. The trailer service brake demand output port 410e is connected to a first inlet of the second shuttle valve 520 by a trailer service brake demand output port line 462. The other inlet to the second shuttle valve 520 is fluidly connectable to the joint supply line 172 by the piloted relay valve 512 via an electronic trailer brake control system output line 555. The second shuttle valve 520 provides a pneumatic OR functionality (i.e., logic control) to forward either the pressure in the trailer service brake demand output port line 462 or the pressure in the electronic trailer brake control system output line 555 (whichever is at the highest pressure) to the trailer brake control coupling 430.

The piloted relay valve 512 is biased to a first position, as shown in FIG. 2, in which the electronic trailer brake control system output line 555, and hence the second input to the shuttle valve is not connected to the joint supply line 172 and is vented to ambient. With the piloted relay valve 512 in this position, if a TSBDS (fluid pressure) is felt in the trailer service brake demand output port line 462, this will be forward by the shuttle valve to the trailer control coupling 430 and the shuttle valve inlet to the piloted relay valve blocked. The piloted relay valve 512 can be moved to a second open position in which the electronic trailer brake control system output line 555, and hence the second input to the shuttle valve 520, is connected to the joint supply line 172 and pressurized. With the piloted relay valve 512 opened, the fluid pressure in the electronic trailer brake control system output line 555 will be forwarded by the shuttle valve to the trailer brake control coupling 430 and the first inlet of the shuttle valve coupled to the trailer service brake demand output port 410e blocked (assuming that there is no TSBDS felt in the trailer service brake demand output port line 462 or that if there is, it is at a lower pressure than the pressure in the electronic trailer brake control system output line 555). The fluid pressure forwarded to the trailer brake control coupling 430 will be forwarded from the coupling to the brake valve on the trailer as a service brake demand signal and will result in the service brakes on the trailer being actuated. The piloted relay valve 512 is a proportional valve capable of being activated to vary the pressure applied in the electronic trailer brake control system output line 555.

Actuation of the piloted relay valve 512 is regulated by the control valve 510, which is operative to selectively apply fluid pressure at a control port 512a of the piloted valve to move the piloted valve from its first position to its second position. The control valve 510 has an outlet port connected to the control port 512a of the piloted relay valve 512 by a pilot line 515 and an inlet port connected to the joint supply line 172. The control valve is a solenoid valve and is biased by a spring to a first position 510a, as shown in FIG. 2, in which the pilot line is disconnected from joint supply line 172 and so is not pressurized. With the control valve 510 in this first position, no fluid pressure is applied at the control port 512a of the piloted relay valve, which is biased to its first position. When energized, the control valve 510 moves to a second position 510b in which it connects the pilot line 515 to the joint supply line 172 so that the pilot line 515 is pressurized. The fluid pressure in the pilot line 515 is applied to the piloted relay valve control port 512a to open the relay valve 512 and hence connect the second shuttle valve 520 and the trailer brake coupling 430 to the joint supply line 172. As illustrated, a pressure relief valve 530 may be provided to limit the pressure applied by the control valve to the control port 512a of the relay valve. The pressure relief valve 430 may limit the pressure applied by the control valve to the control port 512a to about 3 bar, for example.

To prevent pressurized air being trapped in pilot line 515 and the relay valve being held open when the control valve 510 is moved back to the first position 510a from the second position 510b, a discharge valve 540 may be connected to pilot line 515. The discharge valve 540 is a solenoid valve and is operative to vent the pilot line 515 to atmosphere in a first position 540a, to which it is biased by a spring. The discharge valve is energized by the ECU to move to a second position 540b in which the pilot line 515 is not vented to atmosphere when the control valve 510 is energized to the second position 510b to connect the pilot line 515 to the joint supply line and hence air supply 100. The discharge valve provides additional safety as pressurized air trapped in pilot line 515 could hold the relay valve open and result in actuation of the trailer service brakes when not intended, even if control valve 510 is in the first position 510a. The control valve 510 and the discharge valve 540 are controlled by the ECU so that both are moved to their first positions and the pilot line 515 vented when the ECU is not operative to apply the service brakes on the trailer and to move to their second positions to allow the pilot line 515 to be pressurized when the service brakes on the trailer are to be applied. As both valves 510, 540 are biased to their first positions, this provides a fail-safe system which ensures the pilot line 515 is vented and the relay valve 512 returned to its first position so that the service brakes on the trailer are not applied if the electrical supply to the control and discharge valves 510, 540 fails. Alternatively, or in addition, the control valve 510 may be configure to vent the pilot line to ambient when in its first position 510a.

The electronic trailer brake control system 500 is operative to apply the service brake function of the trailer in certain circumstances when the service brake circuit 221 of the towing vehicle is either not pressurized or only pressurized to a limited amount. The electronic trailer brake system 500 is operative in particular to apply the service brake function of the trailer to reduce the risk of jack-knifing, for example when the towing vehicle is under engine braking as described in further detail below.

Jack-knifing occurs when the trailer pushes the towing vehicle (known as PUSH mode or condition) rather than the towing vehicle pulling the trailer (PULL mode or condition). In general terms, a PUSH condition exists if the torque input to the vehicle wheels driven by the inertia of the trailer is greater than the nominal torque supplied by the engine or other prime mover (in certain conditions). This condition may be detected by monitoring one or more parameters available on the vehicle and or trailer. A known parameter used to detect PUSH condition in trucks is the difference of the set engine speed and the current engine speed. When going downhill, the trailer pushes the truck tractor and thereby wheels begin to rotate faster so the setting of the engine speed (depending on the desired speed) and the speed of the engine (transmitted via wheels) would show a deviation. Alternative approaches, include comparing torque supply by the engine with the torque transmitted via the wheels. European Patent EP 2269880 B1, "Brake for a Traction Vehicle Trailer Combination," and European Patent EP 3216333 A2, "Agricultural Train Comprising a Towing Vehicle and a Trailer," disclose arrangements for determining when an agricultural vehicle such as a tractor is in a PUSH condition. A further known system for detecting PUSH condition in a tractor is described in U.S. Patent Application Publication 2023/0009316 A1, "Trailer Brake System," published Jan. 12, 2023. In this system, the vehicle has a continuously-variable hydrostatic transmission. The vehicle transmission includes a first pressure sensor arranged to measure a fluid pressure at a predetermined point within the transmission, and a rotation sensor arranged to determine a rotation direction of a predetermined component in a driveline of the vehicle. When the vehicle is towing a trailer, an ECU unit coupled to the first pressure sensor and rotation sensor determines when a PUSH condition exists based on a particular combination of pressure and rotational direction and applies the trailer brakes to reduce the risk of jack-knifing.

Input from a PUSH condition detection system or sensors for use in detecting a PUSH condition is provided to the ECU as indicated at 600. If a PUSH condition is detected, the electronic pilot trailer brake system 500 is utilized to avoid jack-knifing. In response to a determination that a PUSH condition exists, the ECU energizes the control valve 510 and the discharge valve 540, moving them to their second positions 510*b*, 540*b*. This pressurizes the pilot line 515 causing the piloted relay valve 512 to open so that the pressurized air is forwarded through the electronic trailer brake control system output line 555, the second shuttle valve 520, the trailer service brake demand fluid line 460, and the trailer brake control coupling 430 to the brake valve on the trailer to actuate the service brake function on the trailer.

The ECU can be configured to apply the service brakes on a trailer being towed by the vehicle in dependence on one or more operational conditions of the vehicle and/or trailer other than a PUSH condition being met if appropriate.

The system can be configured such that the trailer service brake demand signal output from the electronic trailer brake control system 500 fed to the trailer control coupling 430 is limited to a pressure below the general maximum pressure limit in the brake system described above so that the electronic trailer brake control system 500 does not initiate a full braking of the trailer, which could result in unsafe driving conditions. The pressure may be limited to 2 to 4 bar, more especially 3 bar, for example. This can be achieved in a number of ways. In one embodiment, a pressure sensor 560 is installed in the trailer service brake demand fluid line 460 from the second shuttle valve 520 to trailer brake control coupling 430 for determining the fluid pressure (TSBDS) applied to the trailer. The pressure sensor 560 provides an input to the ECU and forms part of a closed-loop control for the brake pressure signal TSBDS, enabling the ECU to regulate control valve 510 and hence piloted relay valve 512 to limit the pressure provided to the trailer control coupling 430. If the piloted relay valve 512 is a proportional valve, it can be controlled to set the pressure forwarded to the trailer service brake demand fluid line 460. If the electronic connection fails (such as due to cable break), the ECU can be configured to de-energize the control valve 510 and discharge valve 540 so that the electronic trailer brake function is deactivated and the vehicle is in a safe state.

The electronic control functions of the electronic trailer brake system 500 may be provided by a vehicle ECU or by separate ECU dedicated to the system 500. Use of a dedicated ECU would avoid the need to provide electrical interfaces in a vehicle ECU for this optional feature. In this case, the vehicle ECU and the electronic pilot trailer brake system 500 ECU would communicate via a CAN BUS interface. The ECU may be programmable and comprise a processor and memory as is well known in the art.

It should also be noted that though the pneumatic valves 510, 520, 530, and 540 are described as separate elements, they may be included in a valve manifold.

In an alternative embodiment, the service brakes 200 on the towing vehicle are pneumatic rather than hydraulic. In this case, the trailer brake valve 410 is configured to receive a pneumatic service brake demand signal SBDS at the service brake demand inlet port 410*c*. The pneumatic service brake demand signal SBDS is received from a line of the pneumatic service brake system, the pressure of the pneumatic service brake demand signal SBDS being indicative of a brake demand from the driver. In this case, the trailer brake valve 410 is configured to generate a pneumatic trailer service brake demand signal TSBDS at the trailer service brake demand output port 410*e* which is proportional to, or at least dependent on, the pneumatic pressure applied at the service brake demand inlet port 410*c*. In other respects, the brake system may be essentially the same as the embodiments described above and incorporate an electronic trailer brake control system 500 constructed and operated as described above. Accordingly, the electronic trailer brake system 500 as described above can also be incorporated in a vehicle braking system where the service brakes on the towing vehicle are actuated pneumatically.

The brake system and the embodiments described above provides electronic trailer braking function which can be easily incorporated into existing brake systems that currently only provide operator controlled actuation of the trailer brakes.

Various modifications to the brake system will be apparent to those skilled in the art. For example, the service brake system 200 could have more than one service brake circuit 221 and each service brake circuit 221 could be connected to a respective service brake demand input port 410*e* on the trailer valve so that the trailer service brake demand signal is generated at the trailer service brake demand output port even if only one of the service brake circuits is pressurized, such as in the event of a failure in one of the circuits. Furthermore, the electronic trailer brake control system 500 could be configured without a piloted relay valve 512. In this case, an output port of the control valve 510 could be connected to the electronic trailer brake control system output line 555 to the second shuttle valve.

The invention claimed is:

1. A vehicle brake system comprising:
   a source of pressurized fluid;
   a service brake system having at least one service brake fluid circuit configured to forward a service brake demand of an operator;
   a park brake system having at least one park brake fluid circuit configured to forward a park brake demand;
   a trailer brake control system for connection to a trailer drawn by a vehicle carrying the vehicle brake system, the trailer brake control system having a trailer brake control coupling and a trailer brake valve, the trailer brake valve comprising:
   a service brake demand input port;
   a park brake demand input port;
   a trailer brake demand output port for connection to the trailer brake control coupling, the trailer brake valve configured to provide a fluid pressure output at the trailer brake demand output port which is dependent on the fluid pressure applied at the service brake demand input port or the parking brake demand input port; and
   an electronic trailer brake control system including a control valve operative to selectively connect the trailer brake control coupling with the source of pressurized fluid, the electronic trailer brake control system being operative in use to selectively supply pressurized fluid indicative of the service brake demand or the park brake demand for the trailer to the trailer brake control coupling;
   wherein the vehicle brake system further comprises a shuttle valve configured to fluidly connect the trailer brake demand output port and an output fluid line of the electronic trailer brake control system to the trailer brake control coupling; and
   wherein the electronic trailer brake control system comprises a piloted relay valve operative to selectively connect an input of the shuttle valve to the source of pressurized fluid, operation of the piloted relay valve being controlled by the control valve.

2. The vehicle brake system of claim 1, wherein the electronic trailer brake control system comprises an electronic control system including an electronic control unit (ECU), the ECU being configured in use to actuate the control valve to supply the pressurized fluid indicative of a brake demand for the trailer to the trailer brake control coupling in dependence on meeting at least one operational condition selected from the group consisting of operational conditions of the vehicle and operational conditions of a trailer towed by the vehicle.

3. The vehicle brake system of claim 2, wherein the ECU is configured in use to actuate the control valve to supply the pressurized fluid indicative of a brake demand for the trailer to the trailer brake control coupling in dependence on meeting at least one operational condition indicative of a PUSH condition.

4. The vehicle brake system of claim 1, wherein the control valve is an electronically actuatable solenoid valve operative to cause a second pressurized fluid indicative of a service brake demand for the trailer to be forwarded to the trailer brake control coupling when activated.

5. The vehicle brake system of claim 1, wherein the control valve has an inlet port fluidly connected with the source of pressurized fluid and an outlet port connected with a control port of the piloted relay valve, the control valve being movable between an inoperative position in which the inlet and outlet ports are disconnected and at least one operative position in which the inlet and outlet ports are fluidly connected and the control port of the piloted relay valve is connected with the source of pressurized fluid.

6. The vehicle brake system of claim 1, wherein the piloted relay valve is connected in a fluid line between the source of pressurized fluid and the inlet of the shuttle valve, the piloted valve being biased to an inoperative position in which the shuttle valve inlet is not connected with the source of pressurized fluid and movable to at least one operative position in which the inlet of the shuttle valve is connected with the source of pressurized fluid through the piloted valve in response to the application of fluid pressure at the control port to overcome the bias force.

7. The vehicle brake system of claim 1, wherein the piloted valve is a proportional valve configured such that, in use, the pressure of fluid directed to the trailer brake control coupling is dependent on the fluid pressure applied at a control port of the piloted valve.

8. The vehicle brake system of claim 1, further comprising a pressure discharge valve connected in a fluid line between the control valve and a control port of the piloted relay valve.

9. The vehicle brake system of claim 1, wherein the service brake system is a hydraulic brake system and the source of pressurized fluid is a source of pressurized air.

10. The vehicle brake system of claim 1, wherein the service brake system is a pneumatic brake system and the source of pressurized fluid is a source of pressurized air.

11. An agricultural vehicle comprising the vehicle brake system of claim 1.

12. A vehicle brake system of claim 1, comprising:
a source of pressurized fluid;
a service brake system having at least one service brake fluid circuit configured to forward a service brake demand of an operator:
a park brake system having at least one park brake fluid circuit configured to forward a park brake demand;
a trailer brake control system for connection to a trailer drawn by a vehicle carrying the vehicle brake system, the trailer brake control system having a trailer brake control coupling and a trailer brake valve, the trailer brake valve comprising:
a service brake demand input port;
a park brake demand input port; p2 a trailer brake demand output port for connection to the trailer brake control coupling, the trailer brake valve configured to provide a fluid pressure output at the trailer brake demand output port which is dependent on the fluid pressure applied at the service brake demand input port or the parking brake demand input port; and
an electronic trailer brake control system including a control valve operative to selectively connect the trailer brake control coupling with the source of pressurized fluid, the electronic trailer brake control system being operative in use to selectively supply pressurized fluid indicative of the service brake demand or the park brake demand for the trailer to the trailer brake control coupling;
wherein the electronic trailer brake control system is configured to supply fluid to the trailer brake control coupling at a pressure below a maximum pressure of the trailer service brake system.

13. The vehicle brake system of claim 12, further comprising a first pressure-limiting valve and a second pressure-limiting valve, wherein the first pressure-limiting valve is configured to limit a pressure applied by the source of pressurized fluid at a first threshold pressure, wherein the second pressure-limiting valve is in a fluid line between the source of pressurized fluid and the control valve, and wherein the second pressure-limiting valve is configured to limit the fluid pressure level through the control valve to a second threshold pressure lower than the first threshold pressure.

14. A vehicle brake system comprising:
a source of pressurized fluid;
a service brake system having at least one service brake fluid circuit configured to forward a service brake demand of an operator;
a park brake system having at least one park brake fluid circuit configured to forward a park brake demand;
a trailer brake control system for connection to a trailer drawn by a vehicle carrying the vehicle brake system, the trailer brake control system having a trailer brake control coupling and a trailer brake valve, the trailer brake valve comprising:
a service brake demand input port;
a park brake demand input port;
a trailer brake demand output port for connection to the trailer brake control coupling, the trailer brake valve configured to provide a fluid pressure output at the trailer brake demand output port which is dependent on the fluid pressure applied at the service brake demand input port or the parking brake demand input port; and
an electronic trailer brake control system including a control valve operative to selectively connect the trailer brake control coupling with the source of pressurized fluid, the electronic trailer brake control system being operative in use to selectively supply pressurized fluid indicative of the service brake demand or the park brake demand for the trailer to the trailer brake control coupling;
wherein the vehicle brake system further comprises a pressure sensor for monitoring a pressure of fluid directed to the trailer brake control coupling, the electronic trailer brake control system being operative in dependence on an output from the pressure sensor to maintain the pressure of the fluid directed to the trailer brake control coupling at a predetermined level lower than a pressure of the source of pressurized fluid.

\*   \*   \*   \*   \*